No. 12,820. REISSUED JUNE 23, 1908.
A. F. PRESTON.
MACHINE FOR DRIVING FASTENERS.
APPLICATION FILED MAY 13, 1907.
5 SHEETS—SHEET 1.
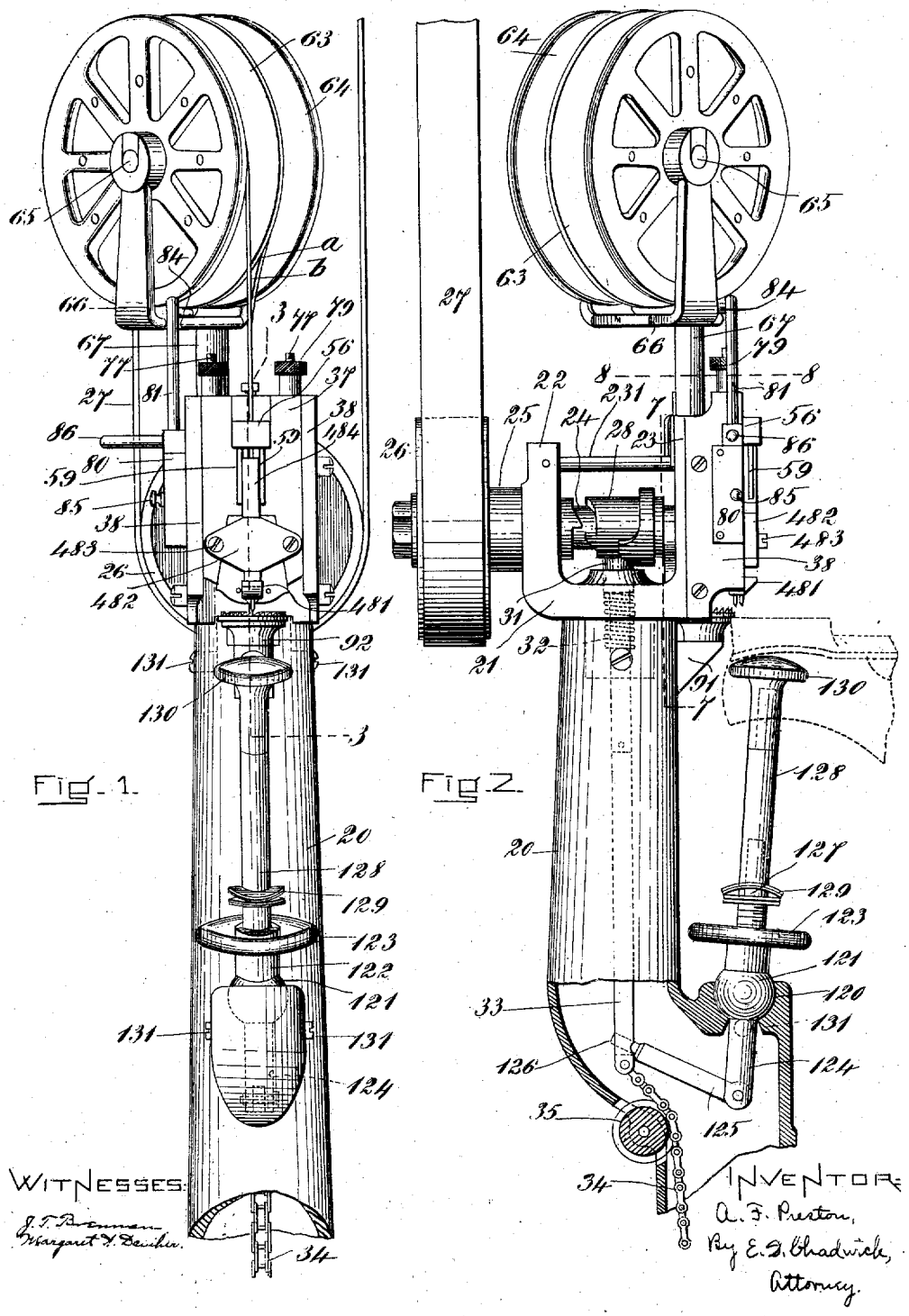
THE NORRIS PETERS CO., WASHINGTON, D. C.

No. 12,820. REISSUED JUNE 23, 1908.
A. F. PRESTON.
MACHINE FOR DRIVING FASTENERS.
APPLICATION FILED MAY 13, 1907.
5 SHEETS—SHEET 2.
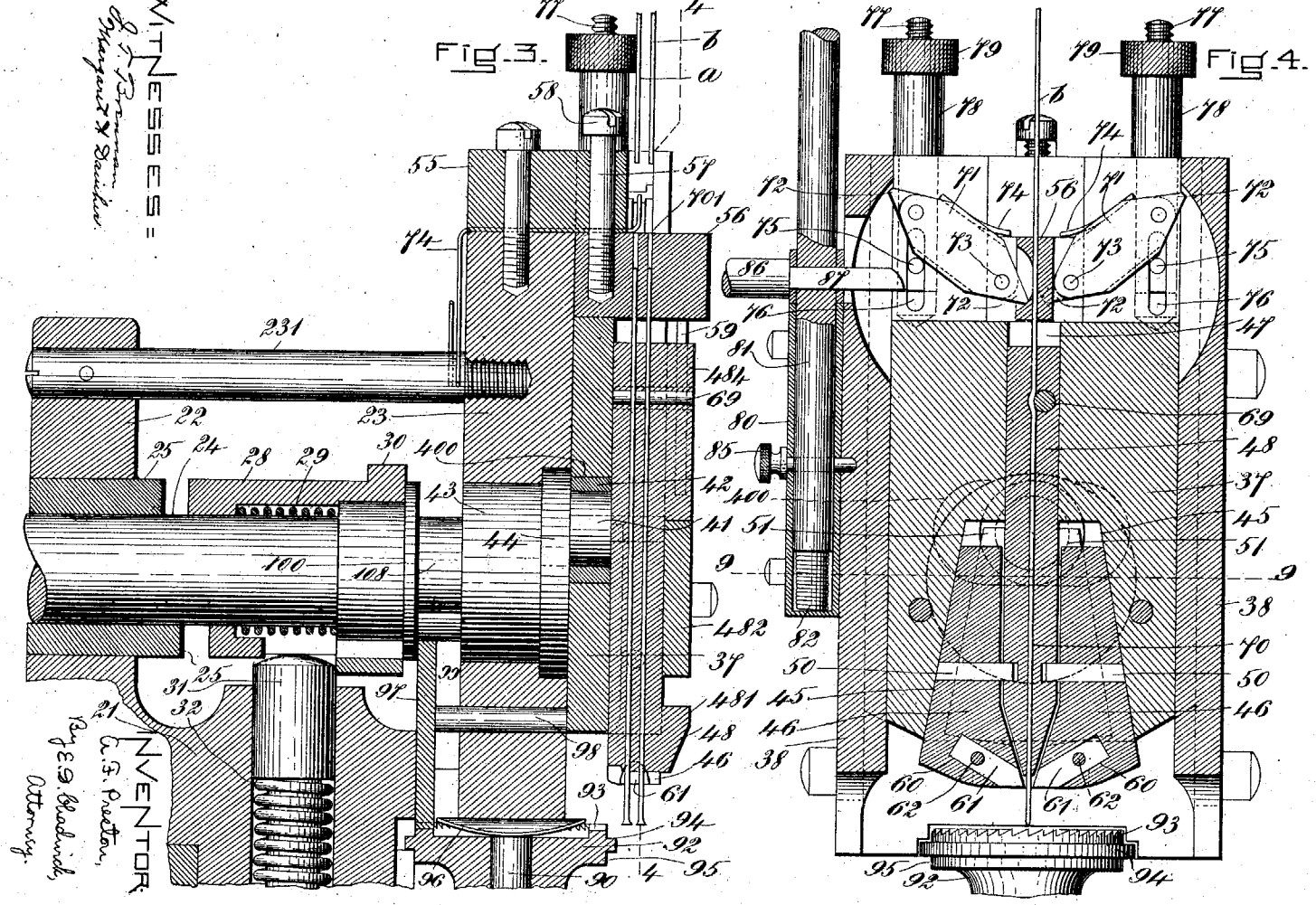
THE NORRIS PETERS CO., WASHINGTON, D. C.

No. 12,820. REISSUED JUNE 23, 1908.
A. F. PRESTON.
MACHINE FOR DRIVING FASTENERS.
APPLICATION FILED MAY 13, 1907.
5 SHEETS—SHEET 3.
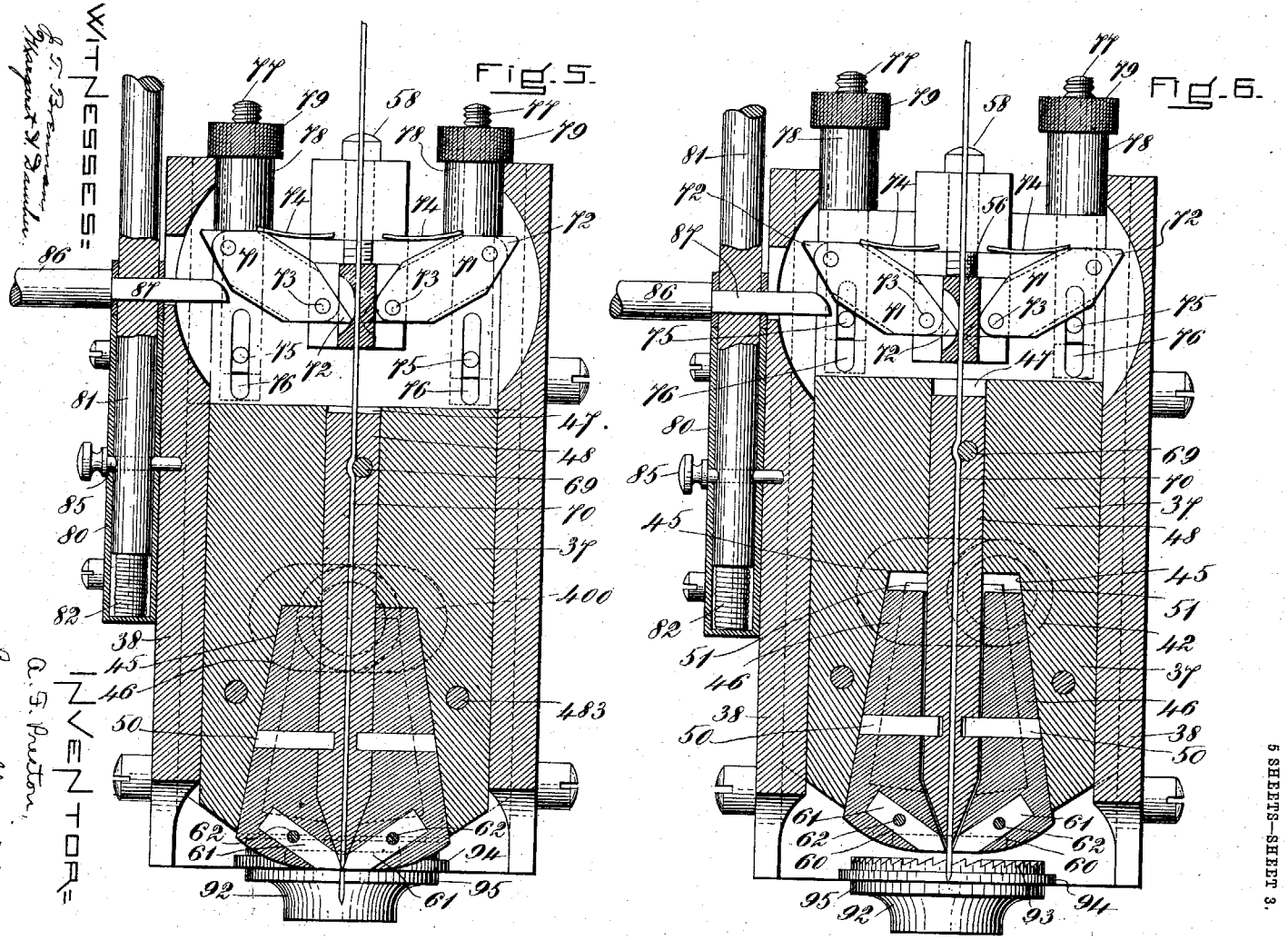
WITNESSES:
J. T. Brennan,
Margaret H. Dauber.
INVENTOR:
A. F. Preston,
By E. D. Bradwick,
Attorney.
THE NORRIS PETERS CO., WASHINGTON, D. C.

No. 12,820. REISSUED JUNE 23, 1908.
A. F. PRESTON.
MACHINE FOR DRIVING FASTENERS.
APPLICATION FILED MAY 13, 1907.
5 SHEETS—SHEET 4.
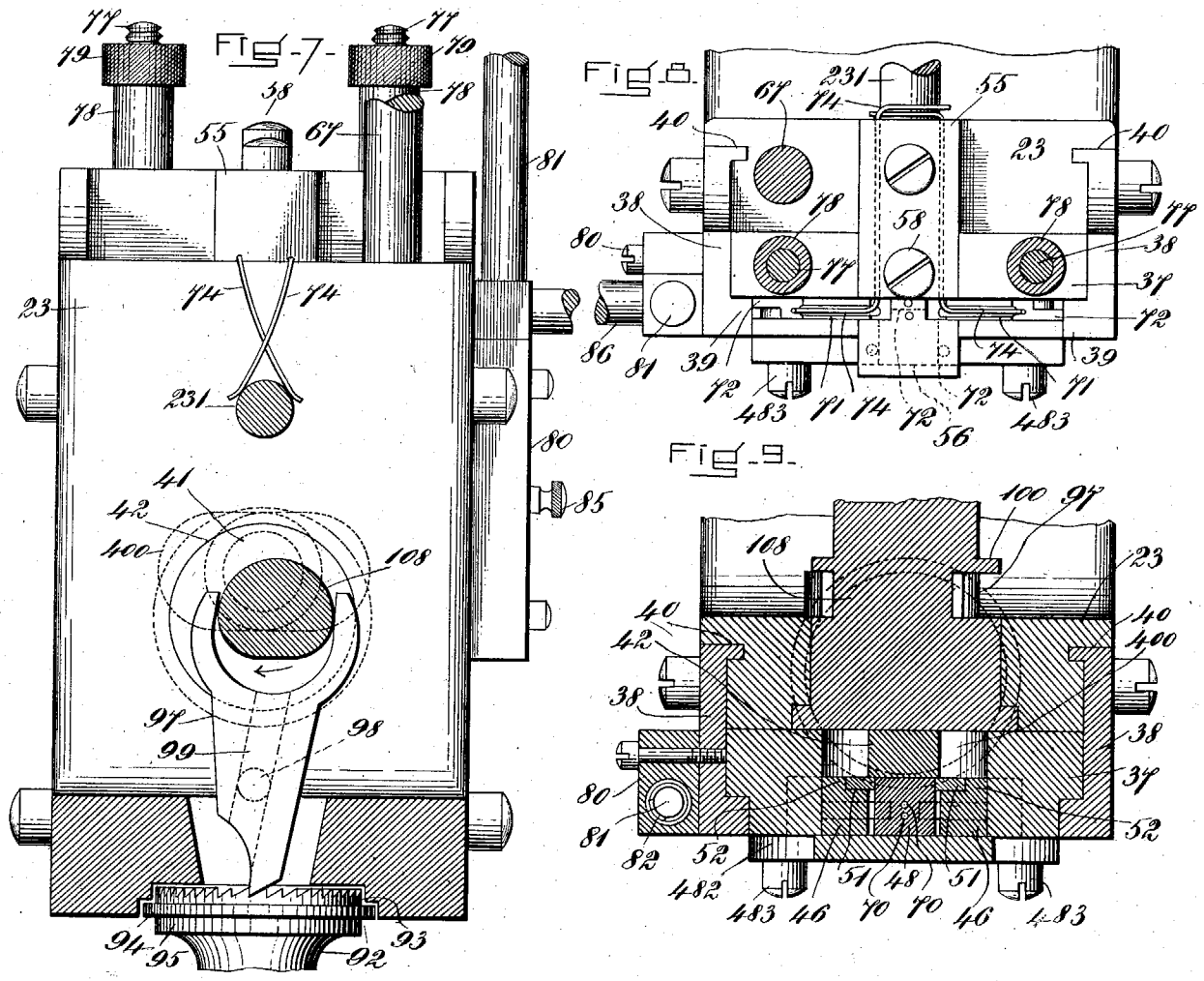
WITNESSES:
J. T. Brennan
Margaret A. Bauhus
INVENTOR:
A. F. Preston,
By E. S. Bladwick,
Attorney.
THE NORRIS PETERS CO., WASHINGTON, D. C.

No. 12,820. REISSUED JUNE 23, 1908.
A. F. PRESTON.
MACHINE FOR DRIVING FASTENERS.
APPLICATION FILED MAY 13, 1907.
5 SHEETS—SHEET 5.
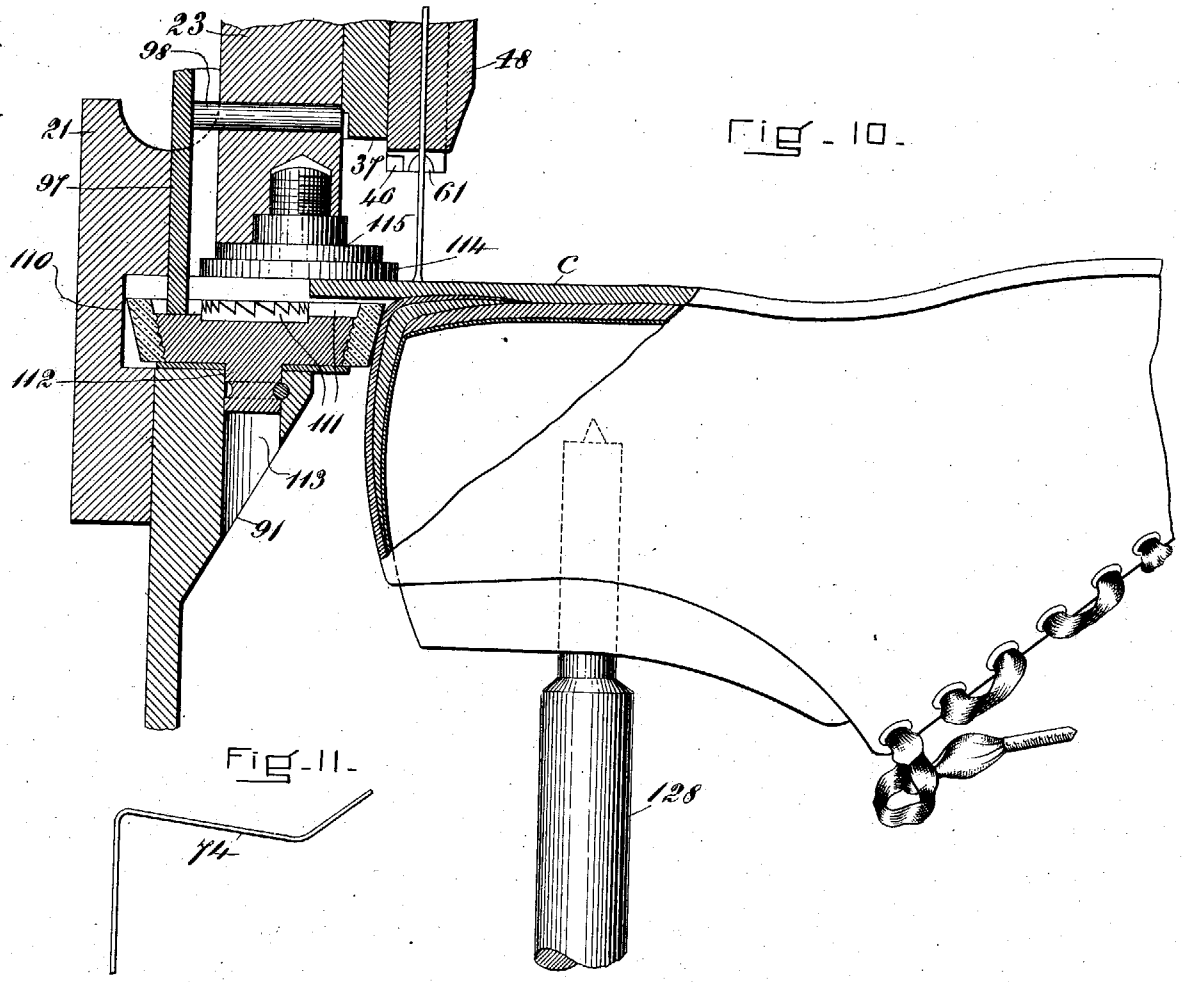
WITNESSES:
A. T. Brennan.
Margaret H. Danicher.
INVENTOR:
A. F. Preston,
By E. D. Bladwick,
Attorney.
THE NORRIS PETERS CO., WASHINGTON, D. C.

UNITED STATES PATENT OFFICE.

ALBERT F. PRESTON, OF BOSTON, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

MACHINE FOR DRIVING FASTENERS.

No. 12,820. Specification of Reissued Letters Patent. Reissued June 23, 1908.

Original No. 820,670, dated May 15, 1906, Serial No. 83,175. Application for reissue filed May 13, 1907. Serial No. 373,521.

*To all whom it may concern:*

Be it known that I, ALBERT F. PRESTON, of Boston, in the county of Suffolk and State of Massachusetts, have invented certain new and useful Improvements in Machines for Driving Fasteners, of which the following is a specification.

This invention has relation to machines for setting metallic fasteners, and is in its general nature similar to the invention of which one embodiment is illustrated in my copending application, Serial No. 32,943, filed October 13, 1900.

My invention is not only adapted for fastening heel-seats, but also for driving fasteners into spring-heeled shoes and for driving slugs into the heels of boots and shoes.

Like the machine in my application referred to, the present machine is designed to feed a length of wire, to drive the end of it into the work, and sever the embedded end from the body of the wire all at one operation and by one contrivance. In severing the embedded end the top of the driven fastener is squared and a chisel-point is formed on the end of the body of the wire, ready for insertion as a fastener.

The present invention has for its object the provision of mechanism whereby two rows of fasteners may be fed, driven into the work, severed, and pointed by the same mechanism, with controlling means whereby a single or double row of fasteners may be driven and severed at will.

The invention has likewise for its object to accomplish a more accurate feeding of the work than has hitherto been possible, whereby the machine will work practically automatically as soon as the work is put in position and the mechanism is set in motion, to provide improved mechanism for holding the work in position against the feeding means, with provisions for permitting it to yield under spring-pressure during the feeding operation, and to permit the severing of the body of the wire into fasteners or nails of various lengths in accordance with the work to be accomplished by the machine.

In thus designing the invention to accomplish these various objects I have had in mind the simplification and strengthening of the mechanism and the formation of the operative parts, such as the cutters, the wire-feeding dogs, and the like, in such way that they may be substituted one for another and replaced in various positions in case they become worn after long use in their primary positions. By this the life of the machine as a whole is greatly lengthened and the necessity of repairs and renewals of parts is obviated to a great extent.

Referring to the drawings which form a part of this specification, Figure 1 represents in front elevation a machine embodying my invention. Fig. 2 represents a side elevation of the same. Fig. 3 represents a section on the line 3 3 of Fig. 1, the parts being shown in full size. Fig. 4 represents a section on line 4 4 of Fig. 3. Fig. 5 represents a section on the same line, but showing the parts in the position they assume at the end of the feeding, driving, and severing stroke of the carrier or driving head. Fig. 6 represents a similar section and shows the parts in the position they assume during the upstroke of the carrier. Fig. 7 represents a section on the line 7 7 of Fig. 2. Fig. 8 represents a section on the line 8 8 of Fig. 2. Fig. 9 represents a section on the line 9 9 of Fig. 4. Fig. 10 represents a section of a machine adapted for use as a heel-seat nailer. Fig. 11 shows one of the springs which operate on the dogs.

On the drawings, 20 indicates a standard upon which is secured the head or frame 21. This head is formed with the two uprights 22, 23, in which is journaled the driving-shaft 24 and which are connected together by the pin 231. Loose upon the said shaft 24 is a sleeve 25, having the belt-pulley 26 for the driving-belt 27. Between the uprights of the head there is a clutch member consisting of a sleeve 28, which is splined upon the shaft 24, so as to move longitudinally thereof, and it is equipped with teeth adapted to engage the teeth upon the sleeve 25, and thus form a clutch to connect the belt-pulley positively with the shaft and effect the rotation of the latter. The sleeve 28 is provided with an internal cavity for the spring 29, whose function is to force said sleeve into engagement with the complemental sleeve 25. Upon the periphery of the sleeve 28 is formed a cam 30, which constitutes, in connection with the pin 31, means for unclutching the parts and for stopping the rotation of the sleeve 28 and the shaft 24.

The pin 31 is adapted to reciprocate in the head of the standard, and it is held yieldingly upward in operative position by a spring 32, placed in a socket in the head. To the lower end of the pin is pivoted a rod 33, which is connected by the chain or flexible connection 34 with a foot-treadle (not shown) pivoted in the base of the standard. When the treadle is depressed, the chain is drawn downward to release the pin 21 from the clutching-sleeve 28 to permit the spring 29 to clutch the pulley and the shaft together. In order to move the rod 33 forward as it is drawn downward, the chain 34 is passed over an idler 35, journaled in the standard, which is somewhat offset, as shown in Fig. 2.

To the sides of the upright 23 of the head or frame are secured guides 38, between which the carrier or driving head 37 is adapted to reciprocate. It will be seen from Fig. 8 that the side guides 38 are provided with flanges 39, which extend in front of the carrier or driving head to hold it against loose movement as it reciprocates. The said guides are also formed with tongues 40, which lie in grooves in the sides of the upright 23 to strengthen the connection between them.

The carrier 37 is formed with an elliptical aperture 400 to receive a crank-pin 41 and roller 42 on the end of the shaft 24, which latter is formed with a head 43 and disk 44, journaled in the upright to hold it against axial movement. As the shaft rotates the crank-pin 41 and roll 32 reciprocate the carrier vertically between the guides 38.

The carrier 37 is formed on its front with a recess (the walls 45 of which converge upwardly, as shown in Fig. 5) for the reception of the wedge-shaped jaws or cutter-blocks 46, 46 and also with a groove 47 for the reception of the wire-guide 48, which has a limited sliding movement therein and which has apertures 70 for the fastener-strips. The said wire-guide is square in section, as shown in Fig. 9, and its lower end is beveled, as shown in Fig. 4, so as to lie between the inwardly-extended sides of the jaws 46. The pins 50 are passed laterally inward from the jaws into apertures in the wire-guide, so that they are caused to move upward and downward simultaneously, while at the same time the cutter-blocks have a lateral movement relatively to the said wire-guide. Further, the said carrier is provided with guides 51, the outer walls of which are inclined for the engagement of the complemental flanges 52 on the jaws 46 and the inner walls of which are parallel to form guiding-surfaces for the wire-guide 48. When the carrier 37 is moved downwardly relatively to the jaws 46, the latter are wedged together by the inclined walls of the cavity formed in the carrier, and when said carrier is moved upwardly relatively to said jaws they are wedged apart by the guides 51 working against the flanges 52. The lower portion of the wire-guide is formed with flanges 481, which overlap the jaws to hold them in place, the wire-guide and the jaws being secured against forward movement by the plate 482, secured to the front face of the carrier by screws 483, which plate also serves to lift the wire guide and jaws when the carrier moves upward.

Secured to the top of the upright 23 is a block 55, which projects forwardly, as shown in Fig. 3, and underneath the front end of this block there is a second block 56. A screw 57 is passed loosely down through the block 55 into threaded engagement with the block 56, so that the said block 56 has a limited vertical movement with respect to the block 55, the length of this movement being determined by the distance between the head 58 of the screw and the top of said block. As the said screw is vertically adjustable, the length of movement or lost motion of the block 56 is variable. As shown in Figs. 1, 2 and 3, two pins or strips 59 of spring metal are carried by and project downwardly from the block 56 and bear yieldingly against the sides of a forwardly-projecting portion 484 of the wire-guide 48 to frictionally resist the up-stroke and down-stroke of said guide without resisting the stroke of the carrier. From this it is manifest that when the downstroke of the carrier begins the wire-guide and the jaws first descend to the limit determined by the contact of the screw-head 58 with the top of block 55 and are then yieldingly retarded to cause the jaws to approach each other at their lower ends and grip the fastener strips, and that when the upstroke of the carrier begins the block 56 first rises until it abuts against the block 55, whereupon the same frictional resistance to the movement of the wire-guide and the jaws causes the separation of the jaws, and that in either case there is an initial movement of the wire-guide, the jaws, and the frictional resisting device (the block 56 and the spring-strips 59) due to the lost motion of the block 56 before the frictional resistance to the movement of the wire-guide and the jaws relatively to the carrier commences.

In the lower ends of the jaws or cutter-blocks 46 are inclined sockets 60 for the reception of the cutters 61. These cutters are cylindrical in form; but their operative ends are beveled to form the cutting edges and to permit them to be reversed, or turned upside down, after they have become worn in one position. These cutters are coacting, and their beveled portions are such that the lower beveled faces are substantially horizontal, as shown in Fig. 4, and lie flush with the lower surface of the jaws or cutter-blocks 46. The cutters are secured in their sockets by pins 62, which hold them against rotation and which may be removed to reverse the cutters or replace them.

The wire-guide 48 has provisions for the reception of two fastener-strips *a*, *b*, so that two nails, slugs, or fasteners may be fed, driven, and severed simultaneously, if desired. As shown in Fig. 3, the strips *a*, *b* lie on both sides of the center of the operative edge of the cutters 61, 61. They are wound upon reels 63, 64, journaled independently upon a shaft 65, mounted in the forked bracket 66, whose supporting-standard 67 is secured in the top of the upright 23, as shown in Figs. 1, 7 and 8. These reels are adapted to rotate independently of each other, and, as will be subsequently described, I provide a brake to engage the reel 63 when the wire *b* is not being fed. In order to straighten out any "kinks" or bends there may be in the fastening-strip *a*, *b*, a pin 69 is passed through the guide 48, so as to form a bend in the apertures 70 for the strips, as shown in Fig. 4, whereby the strips are straightened when a relative movement of the pin 69 and the strips is effected during the operation of the machine.

The feeding of the strips is effected by the cutters during the downward stroke of the carrier; but it is essential that the strip shall be held against upward movement during a portion at least of the upward stroke of the carrier, in order that the tools may get a fresh bite. So for the purpose of preventing the retrograde movement of the strips I provide locking-dogs 71, 71. These dogs are of the shape shown in Fig. 4, being pointed at the ends to provide fingers 72, 72, which are offset with relation to each other. One finger is formed by cutting away one face at one end of the dog and the other by cutting away the opposite face at the other end of the dog. Each of the dogs is pivoted upon a pin or stud 73, passed through the block 56, which is grooved in its sides to receive said dogs. The block 56 has apertures 701 for the passage of the fastening-strips *a*, *b*, and in each of the grooves formed in the block 56 there is a cavity which exposes the side of the strip in order that it may be engaged by the operative end 72 of the dog. The dogs are reversible, so that when the end of one becomes worn it may be turned end for end and replaced in position. Said dogs are arranged at an angle to each other or an inclination both to the vertical or horizontal, so that they do not obstruct the free downward movement of the strips, but prevent the latter from moving upwardly with relation thereto so long as they are in operative position. The dogs are held yieldingly in operative position by springs 74, which are formed of wires passed through grooves or apertures in the block 55 and having their ends crossed and engaged with the screw-pin 231, hereinbefore referred to. The ends of the spring-wires 74 are bent, as shown in Fig. 4, so as to bear against the dogs, as shown in perspective view in Fig. 11.

The lost motion of the block 56 (to which the locking-dogs are pivoted) when the carrier begins its upstroke permits the locking-dogs and the fastener-strips to be lifted slightly to permit the work to be fed under the projecting lower ends of the strips without the said ends engaging it, so that the normal feed of the wire would be equal to the distance of the movement of the carrier less the amount of lost motion of the block 56; but I provide means for disengaging the dogs at any point during the upward stroke of the carrier, so as to vary the length of the nails, slugs, or fasteners. This is accomplished by providing adjustable stop-pins 75, arranged in slots 76 in the carrier. They are formed upon the ends of vertical adjustable screws 77, which are arranged in apertures in the carrier 37 and with which are engaged rotatable nuts 78, having the milled portions 79 to permit them to be easily rotated. The stop-pins 75 are independently adjustable, and consequently I provide for simultaneously feeding two slugs, nails, or fasteners of different lengths into the work. As the carrier moves upward the dogs engage the fastening-strips and hold them against retrograde movement until said stop-pins 75 engage the dogs and move them to inoperative position, after which the fastener-strips move upward with the wire-guide with which they are in frictional engagement.

In addition to varying the length of the fasteners I provide means for preventing the feed of one of the fastener-strips, and to accomplish this I provide the following mechanism: Secured to the side of one of the guides 38 is a hollow guide-bar 80, in which is placed a vertically-movable slide 81, held normally raised by a spring 82, placed in the bottom of the socket. The upper end of the slide is provided with a pin 84, which when the slide is raised engages the reel 63 and acts as a brake to prevent its rotation. The slide, however, may be locked in an inoperative position by a pin 85, passed laterally through the guide-bar and into the slide. A handle 86 projects laterally from the slide above the guide-bar, and it is formed with a stop 87, which when the slide is raised is in the path of the outer end of one of the dogs 71, so as to hold said dog in an inoperative position during the entire upstroke of the carrier.

When the pin 85 is removed and the slide 81 is forced yieldingly upward by the spring 82, the dog 71, which coacts with the stop 87, is held constantly in an inoperative position, and the fastener-strip *b* moves upward and downward with the carrier and the wire-guide without being fed or driven into the work, this without effecting the feeding, driving, and severing of the fasteners from the other strip *a*. When the slide, however, is forced downward and locked in inoperative position, the stop 87 is held out of engagement with the dog 71 and permits the feeding of the strip *b* as the carrier reciprocates.

For the purpose of feeding the work I journal upon the vertical stud 90, formed in a bracket 91, projecting forwardly from the standard 20, a feed-wheel 92, which is formed in its face with the ratchet-teeth 93. The periphery of this wheel is formed with a flange 94, which is engaged by the jaws prior to the completion of the downstroke of the carrier to stop said jaws, whereby they are forced positively together by the wedging action of the walls 45, hereinbefore referred to, thus causing the cutters to sever the fastener and forming a point upon the end of the strip. Below the flange 94 the wheel has a peripheral surface 95, against which the work may be held, the under face of the flange 94 coöperating with the surface 95 and resting upon the top of the work. A bent disk-spring 96 is placed between the feeding-wheel and the head or frame of the machine so as to offer a frictional resistance to the movement of the feed-wheel and prevent retrograde movement thereof. To feed the said wheel, I provide a pawl 97, having a groove 99 to receive the end of a stud 98, as shown in Figs. 3 and 7. The body of the pawl is held against dislocation by being placed against the face of the standard and against a flange 100, formed on the shaft 24. (See Fig. 3.) The shaft is formed with a cam or eccentric portion 108, and the pawl is bifurcated to take on both sides thereof, so that as the shaft rotates the pawl is oscillated about the stud 98. It drops into engagement with the teeth of the feed-wheel by gravity and also by reason of the frictional engagement of the eccentric or cam 108 with its bifurcated end, but is free to ride up over a tooth as it is oscillated in a reverse direction. From this it will be apparent that for each rotation of the shaft and complete reciprocation or oscillation of the carrier the feed-wheel is advanced one step, and consequently the work is advanced one step for each fastener or pair of fasteners driven thereinto. The parts are so timed that the feeding of the work does not take place until the carrier has commenced its upward movement to slightly lift the projecting ends of the fastener-strips out of engagement with the work to prevent their dragging against the face thereof.

In Fig. 10 I have shown the machine as especially adapted for securing the heel end of the outer sole to the insole before the heel is placed upon the shoe. This type of machine is commonly termed a "heel-seat nailer." The sole usually projects beyond the upper at the rear end of the shoe, and consequently provision must be made for the reception thereof. In the last-mentioned figure it will be observed that the feed-wheel 110 is somewhat ring-shaped to bear against the upper and is mounted to surround the periphery of the ratchet 111, the last-mentioned part in this case being provided with a shaft 112, journaled in a bearing 113 in the bracket 91. Above the feed-wheel I provide a shoulder 114, with which the jaws may be engaged to cause the cutters to sever the driven wire. The shoulder is formed upon a disk 115, mounted upon the under side of the head, there being a sufficient space between the said shoulder and the feed-wheel for the reception of the sole *c*, as indicated.

A work-support is provided which is adapted for the reception either of a shoe upon the last or a partly-completed shoe from which the last has been removed, according to the character of the work to be accomplished.

The standard, as shown in Fig. 2, is formed with a semispherical socket 120 for the reception of a spherical portion 121 of an internally-threaded sleeve 122, which is equipped with the hand-wheel 123. Passed through said sleeve is a threaded post 124, whose lower end is loosely connected by a rod 125 with the rod 33. The rod 125 has a finger 126, which projects into a tapered aperture in the lower end of the said rod 33. The upper end of the post is provided with a spindle 127 to receive an extension 128, which has a socket to receive the spindle. Between the lower end of the extension 128 and the upper end of the post 124 are placed disk-springs 129. The upper end of the extension 128 is reduced to receive the clenching-head 130 or receive a last, the head being removable when desired, so that the reduced portion may extend into the aperture in the top of the last. The head 130 is adapted to freely rotate upon the post as the work is fed by the feed-wheel.

When a last is put on the post and the treadle is depressed, the chain forces the rod 125 forwardly and swings the post inward until the work rests against the feed-wheel. The engagement of the work with the feed-wheel is yielding, since the spring 32 is not completely compressed by the action of the treadle, and therefore the rods 33 and 125 are free to move under the pressure of the foot of the operator to the desired extent to effect said yielding engagement.

So far as I am aware I am the first to provide mechanism interposed between the treadle and the work-supporting post whereby the work is forced horizontally against a feeding device and whereby the release of the treadle permits the work-support to be swung to a position of clearance. Passed into the standard are two screws 131, which may be adjusted to permit the post to swing sidewise or else to hold said post against all motion except forward and back.

Having thus explained the nature of the invention and described a way of constructing and using the same, although without attempting to set forth all of the forms in which it may be made or all of the modes of its use, I declare that what I claim is:—

1. A machine for feeding, driving and severing fasteners simultaneously in two rows comprising means for reciprocating said fasteners toward and from the work, means for preventing retrograde movement of said fasteners to effect the feeding thereof in relation to said reciprocating means, and means for rendering said preventing means inactive to an extent to prevent the feeding, driving and severing of fasteners in one row while it is continued in the other.

2. A machine of the character described having a single pair of jaws for feeding, driving and severing fasteners from two strips simultaneously in two separate rows, and means whereby said mechanism may be rendered inoperative with respect to one strip at will without affecting its operative relation to the other strip.

3. A machine of the character described having a single mechanism for simultaneously severing and driving fasteners from two strips in two rows with provisions for varying the lengths of the severed fasteners in said rows, and means whereby said mechanism may be rendered inoperative with respect to one strip at will without affecting its operative relation to the other strip.

4. A machine of the character described, comprising a pair of jaws constructed to feed a strip of fastener material, drive one end of the same into the work and sever fasteners from the driven end of the strip, with provisions for varying the length of the severed fasteners, and means for operating the jaws.

5. A machine of the character described, comprising a carrier having a recess with upwardly-converging walls, wedge-shaped jaws fitting said recess, coacting cutters on said jaws for feeding, driving and severing fasteners from a strip, and means for operating said jaws and cutters.

6. A machine of the character described, comprising two movable jaws, coacting cutters on said jaws, means including inclined guides for wedging said jaws together to grip the wire, the inclination of said guides being equal to insure the meeting of the cutters at the center of the wire, and means for actuating said jaws to cause the feeding, driving and severing of fasteners from the end of the wire.

7. A machine of the character described, comprising a combined feeding, driving and severing mechanism for feeding, driving and severing fasteners from a strip, a dog to engage the strip and prevent retrograde movement thereof, and means for rendering said dog inoperative.

8. A machine of the character described, comprising a combined feeding, driving and severing mechanism for feeding, driving and severing fasteners from a strip, a dog to bite the strip and prevent retrograde movement thereof, and means for providing a predetermined retrograde movement of the strip.

9. A machine of the character described, comprising a reciprocatory carrier, actuating means on said carrier, coacting cutting-jaws on said carrier adapted to be actuated by said actuating means for feeding, driving and severing fasteners from the end of a strip, and a wire-guide, the said guide and cutting-jaws being vertically movable with respect to said carrier and connected together whereby independent movement of the guide imparts similar movement to said cutting-jaws, the carrier being formed to cause the jaws to approach and recede from each other during their vertical movements relatively to the carrier.

10. A machine of the character described comprising a reciprocatory carrier, actuating means on said carrier, coacting cutting-jaws on said carrier adapted to be actuated by said actuating means for feeding, driving and severing fasteners from the end of a strip, and a wire-guide, the said guide and cutting-jaws being vertically movable with respect to said carrier and connected together whereby independent movement of the guide imparts similar movement to said cutting-jaws, the said guide having provisions for frictionally retarding the passage of the wire therethrough.

11. A machine of the character described comprising a single mechanism for feeding, driving and severing fasteners from the end of a metallic strip, said mechanism consisting of coacting cutters, a reciprocatory cutter-carrier, the cutters being capable of vertical movement independently of the carrier, means for holding the cutters against movement with the carrier during a portion of the movement of the latter, and provisions on said carrier for causing the cutters to be wedged together to bite into the strip when the movement of the strip is retarded and for causing said cutters to sever the end of the strip when they are held against movement relatively to the said carrier.

12. A machine of the character described comprising a movable carrier, jaws on said carrier in wedging relation thereto, whereby when said carrier is moved in one direction, the jaws are wedged together to drive a strip into the work, and when it is moved in the opposite direction, the jaws are separated to get a fresh bite on the strip, and means for retarding the initial movement of the jaws longitudinally of the path of movement of the carrier, to cause the jaws to approach or recede from each other.

13. A machine of the character described comprising a movable carrier, cutting-jaws on said carrier for gripping, driving and cutting fasteners from the end of a wire, said jaws having a longitudinal movement independently of the carrier, means whereby when the carrier is moved toward the work the cutting jaws grip the wire, and when it is moved in the opposite direction the jaws are separated to get a fresh bite on the wire, and provisions for retarding the movement of the jaws longitudinally of the path of movement of the carrier to cause said jaws to approach or recede from each other.

14. In a machine of the character described, a movable carrier, coacting jaws on said carrier in wedging relation thereto, friction devices for retarding the movement of said jaws longitudinally of the path of movement of the carrier, and provisions for permitting a limited free movement of said friction devices.

15. A machine of the character described, comprising a movable carrier having converging guides, wedge-shaped jaws loose in said guides and adapted to be wedged toward and from each other thereby as the carrier is moved relatively to said jaws, and a stop in the path of said jaws to hold them against movement whereby the continued movement of said carrier causes the guides to complete the closing movement of said jaws.

16. A machine of the character described, comprising a movable carrier having converging guides, wedge-shaped jaws loose in said guides and adapted to be wedged toward and from each other thereby as the carrier is moved relatively to said jaws, friction devices for retarding the movement of said jaws to effect a partial closing thereof, and a stop in the path of said jaws to effect a final closing thereof.

17. A machine of the character described comprising a carrier adapted to reciprocate a strip, coacting jaws on said carrier to feed, drive and sever fasteners from said strip, a device for preventing retrograde movement of the strip, the failure of said movement being equivalent to a feeding of said strip with relation to said carrier, and provisions whereby said device may be rendered inoperative while the machine is in operation.

18. A machine of the character described, comprising mechanism for setting fasteners, a shaft for actuating said mechanism, a clutch, a work-support movable laterally to bring the work under said mechanism, and means for controlling said clutch and yieldingly moving said work-support to and holding it in operative position.

19. A machine of the character described comprising a pair of opposed severing jaws, a support on which said jaws are mounted to move towards each other, means for presenting a strip of fastener material between said jaws in a predetermined line of drive, and mechanism for actuating said jaws to cause them to grip said strip, drive it into the work and completely sever said strip immediately at the end of the driving operation, said mechanism including means for compelling simultaneous and equal closing movements of said jaws during the gripping and severing action of the same.

20. A machine of the character described comprising a pair of opposed severing jaws, a support on which said jaws are mounted to move towards each other, means for presenting a strip of fastener material between said jaws in a predetermined line of drive, automatic mechanism for continuously actuating said jaws to cause them to grip, feed, drive and sever said strip, said mechanism including means for compelling simultaneous and equal closing movements of said jaws during the gripping and severing action of the same, and means for holding said strip against retrograde movement.

21. A machine of the character described comprising a work support, a movable carrier and a pair of opposed severing jaws mounted thereon, and means for actuating said carrier and jaws to cause the latter to grip, drive into stock supported by the work support and sever a strip of fastener material, said means comprising devices for compelling simultaneous and equal closing movements of said jaws during the gripping and severing action of the same.

22. A machine of the character described, comprising a movable carrier and a pair of opposed severing jaws mounted thereon, means for actuating said carrier and jaws to cause the latter to grip and feed a strip of fastener material, drive it into the work and completely sever said strip immediately at the end of the driving operation, said means comprising devices for compelling simultaneous and equal closing movements of said jaws during the gripping and severing action of the same, and means for holding said strip against retrograde movement.

23. In a machine of the character described, the combination with a movable carrier, a pair of opposed severing jaws mounted thereon and adapted to receive a strip of fastener material between them, and means for actuating said carrier and jaws to cause the latter to grip and feed a strip of fastener material, drive it into the work and completely sever said strip immediately at the end of the driving operation, of a device for holding the strip against retrograde movement, said device being movable relatively to said jaws in the direction of the length of said strip, and means for varying the extent of said relative movement.

24. A machine of the character described comprising a work support, a movable carrier and a pair of opposed severing jaws mounted thereon and adapted to receive a strip of fastener material between them, means for actuating said carrier and jaws to cause the latter to grip, drive into stock supported by said work support and sever a strip of fastener material, a block mounted to move relatively to said jaws in the direction of the length of said strip, means carried by said block for holding the strip against retrograde movement, and means for varying the extent of the relative movement of said block and jaws.

25. A machine of the character described having a single mechanism for simultaneously driving and severing fasteners from two strips in two rows and provisions for varying the lengths of the severed fasteners independently in each row.

26. A machine of the character described having a single mechanism for simultaneously driving and severing fasteners from two strips in two rows, provisions for varying the lengths of the severed fasteners independently in each row, and means for varying the lengths of the severed fasteners simultaneously in both rows.

27. A machine of the character described comprising means for simultaneously driving a plurality of strips of fastener material in a plurality of rows, and severing the same to form fasteners, means for varying the lengths of all the fasteners simultaneously, and means for varying the lengths of the fasteners in each row independently.

28. A machine of the character described comprising a pair of opposed severing jaws, a support on which said jaws are mounted to move towards each other, a support for the work, means for actuating said jaws to cause them to grip, drive and sever a strip of fastener material presented between them, and means for compelling the cutting edges of both jaws to move simultaneously in the direction of the length of said strip during the driving of the fastener material.

29. A machine of the character described comprising a reciprocating carrier and a pair of opposed severing jaws mounted thereon, means for presenting a strip of fastener material between said jaws in a line perpendicular to the plane determined by their cutting edges, means for actuating said jaws to cause them to grip, drive and sever said strip, and means for insuring simultaneous movements of their cutting edges in the direction of reciprocation of said carrier.

30. A machine of the character described comprising a reciprocating carrier, coacting cutting jaws mounted on said carrier, and means for actuating said jaws to feed, drive into the work and sever immediately at the end of the driving operation fasteners from a strip of fastener material, and means for insuring that the cutting edges of said jaws determine always a plane substantially perpendicular to the direction of reciprocating movement of said carrier.

31. A machine of the character described comprising a reciprocating carrier, coacting cutting jaws mounted directly on said carrier reciprocating therewith and also movable relatively thereto in the direction of its reciprocating movement, and movable relatively to each other in a direction transverse to that of said reciprocating movement, and means for preventing movement of said jaws relatively to each other in the direction of the reciprocating movement of said carrier during the reciprocating movement of the jaws and actuating means for said jaws.

32. A machine of the character described comprising a reciprocating carrier, reciprocating coacting cutting jaws mounted on said carrier and movable relatively thereto in the direction of its reciprocating movement, and also movable relatively to each other in a direction transverse to that of said reciprocating movement, means for preventing movement of said jaws relatively to each other in the direction of the reciprocating movement of said carrier, and operating means for said jaws acting through said last-named means during the reciprocating movement of the jaws.

In testimony whereof I have affixed my signature in presence of two witnesses.

ALBERT F. PRESTON.

Witnesses:
E. D. CHADWICK,
JOSEPH T. BRENNAN.